United States Patent
Berk et al.

(10) Patent No.: US 9,934,128 B2
(45) Date of Patent: Apr. 3, 2018

(54) DYNAMIC PER-METHOD PROBING DURING RUNTIME

(71) Applicant: Red Hat, Inc., Raleigh, NC (US)

(72) Inventors: Lukas Berk, Toronto (CA); Frank Christopher Eigler, Brantford (CA)

(73) Assignee: Red Hat, Inc., Raleigh, NC (US)

( * ) Notice: Subject to any disclaimer, the term of this patent is extended or adjusted under 35 U.S.C. 154(b) by 1095 days.

(21) Appl. No.: 14/080,596

(22) Filed: Nov. 14, 2013

(65) Prior Publication Data
US 2015/0135167 A1    May 14, 2015

(51) Int. Cl.
*G06F 9/44*      (2006.01)
*G06F 11/36*     (2006.01)

(52) U.S. Cl.
CPC ...... *G06F 11/3644* (2013.01); *G06F 11/3636* (2013.01)

(58) Field of Classification Search
CPC .......................................................... G06F 9/44
USPC ................................................. 717/128–133
See application file for complete search history.

(56) References Cited

U.S. PATENT DOCUMENTS

| | | | | |
|---|---|---|---|---|
| 4,617,663 A * | 10/1986 | Lake | ................... | G06F 11/3684 714/32 |
| 4,694,396 A * | 9/1987 | Weisshaar | ........ | G05B 19/41845 709/230 |
| 5,901,315 A | 5/1999 | Edwards et al. | | |
| 5,991,541 A * | 11/1999 | Ozalp | ................... | H04Q 3/0037 379/207.01 |
| 6,067,577 A * | 5/2000 | Beard | ................. | G06F 9/44521 712/E9.084 |
| 6,282,702 B1 * | 8/2001 | Ungar | ................. | G06F 9/45504 717/148 |
| 6,625,808 B1 * | 9/2003 | Tarditi | .................. | G06F 9/4425 707/999.202 |
| 7,281,242 B2 | 10/2007 | Inamdar | | |
| 7,478,366 B2 * | 1/2009 | Bickson | ............. | G06F 11/3664 703/6 |
| 7,568,186 B2 * | 7/2009 | Bhattacharya | ...... | G06F 11/3636 717/124 |
| 2004/0123279 A1 * | 6/2004 | Boykin | ............... | G06F 11/3644 717/158 |
| 2004/0215733 A1 * | 10/2004 | Gondhalekar | ... | H04N 21/23617 709/207 |

(Continued)

OTHER PUBLICATIONS

Project Kenai Documentation and Training; Project Kenai New Features and Release Notes; pp. 1-14; retrieved Nov. 13, 2013 from https://kenai.com/projects/help/pages/ReleaseNotes.

(Continued)

*Primary Examiner* — Jae U Jeon
(74) *Attorney, Agent, or Firm* — Haynes and Boone, LLP

(57) ABSTRACT

A system, method, and techniques for dynamically probing a method are provided. An example method includes identifying a target method to probe in an application. The method also includes modifying the target method to include a call to a helper method that passes a rulename to a native method in a shared object library. The native method includes a marker associated with a probe point inserted in the application at a location relative to the target method, and the rulename identifies the marker associated with the probe point. The method further includes during execution of the application on a computing device, detecting when the target method is invoked. The method also includes when the method is invoked, passing the rulename to the native method in the shared object library.

20 Claims, 3 Drawing Sheets

(56) References Cited

U.S. PATENT DOCUMENTS

| | | | |
|---|---|---|---|
| 2005/0114494 A1* | 5/2005 | Beck | G06F 9/542 |
| | | | 709/224 |
| 2005/0122329 A1* | 6/2005 | Janus | G06F 13/122 |
| | | | 345/501 |
| 2008/0052696 A1* | 2/2008 | Pradadarao | G06F 11/3644 |
| | | | 717/158 |
| 2009/0132998 A1 | 5/2009 | Meijer et al. | |
| 2011/0214108 A1 | 9/2011 | Grunberg et al. | |
| 2012/0023496 A1 | 1/2012 | Kwak et al. | |

OTHER PUBLICATIONS

BTrace:Core: samples DTraceInline.java—Project Kenai, Source code file content, retrieved Nov. 13, 2013 from https://kenai.com/projects/btrace/sources/hg/content/samples/DTraceInline.java, pp. 1-2; Copyright 2008-2010 Sun Microsystems, Inc. Santa Clara, CA 95054, USA.

White Paper; "Dynamic Tracing Support in the Java HotSpot™ Virtual Machine", The Java™ Platform, Standard Edition 6 (Java SE 6), Copyrighted 2005 Sun Microsystems, Inc., Santa Clara, CA 95054, USA, pp. 1-18.

Peter W. Gill, "Probing for a Continual Validation Prototype", May 2001, pp. 1-111; http://www.wpi.edu/Pubs/ETD/Available/etd-0826101-235008/unrestricted/gill.pdf.

Dynamic Probes, About Dynamic Probes, pp. 1-2; retrieved Nov. 14, 2013 from http://dprobes.sourceforge.net/.

Hendrik Weimer, OS Reviews, strace: Dissecting Program, retrieved Nov. 14, 2013 from http://www.osreviews.net/reviews/admin/strace, Copyright 2006-2008 OS Reviews.

\* cited by examiner

DYNAMIC PER-METHOD PROBING DURING RUNTIME

FIELD OF DISCLOSURE

The present disclosure generally relates to computer software development tools, and more particularly to probing one or more methods of an application.

BACKGROUND

An integrated development environment (IDE) provides a set of tools such as editing and debugging software for programmers. These tools are used to create and debug software programs. The IDE supports software development by providing a windowed system for source file editing, project management, and file interdependency management and debugging. Many types of programming tools exist that are not part of an IDE and are used on a stand-alone basis.

An example of a stand-alone tool is Systemtap. Systemtap is an instrumentation system that provides a scripting language and command line interface for monitoring system performance.

BRIEF SUMMARY

Methods, systems, and techniques for dynamically probing a method are disclosed. One or more applications may be probed on a per-method basis during runtime.

According to an embodiment, a method of dynamically probing a method includes identifying a target method to probe in an application. The method also includes modifying the target method to include a call to a helper method that passes a rulename to a native method in a shared object library. The native method includes a marker associated with a probe point inserted in the application at a location relative to the target method, and the rulename identifies the marker associated with the probe point. The method further includes during execution of the application on a computing device, detecting when the target method is invoked. The method also includes when the method is invoked, passing the rulename to the native method in the shared object library.

According to another embodiment, a system for dynamically probing a method includes a kernel module that identifies a target method to probe in an application. During execution of the application on a computing device the kernel module detects when the target method is invoked. The system also includes a helper method that passes a rulename to a native method in a shared object library. The system also includes a code injector that modifies the target method to include a call to the helper method that passes the rulename to the native method in the shared object library, where the native method includes a marker associated with a probe point inserted in the application at a location relative to the target method, and the rulename identifies the marker associated with the probe point.

According to another embodiment, a non-transitory machine-readable medium including a plurality of machine-readable instructions that when executed by one or more processors is adapted to cause the one or more processors to perform a method including: identifying a target method to probe in an application; modifying the target method to include a call to a helper method that passes a rulename to a native method in a shared object library, where the native method includes a marker associated with a probe point inserted in the application at a location relative to the target method, and the rulename identifies the marker associated with the probe point; during execution of the application on a computing device, detecting when the target method is invoked; and when the method is invoked, passing the rulename to the native method in the shared object library.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
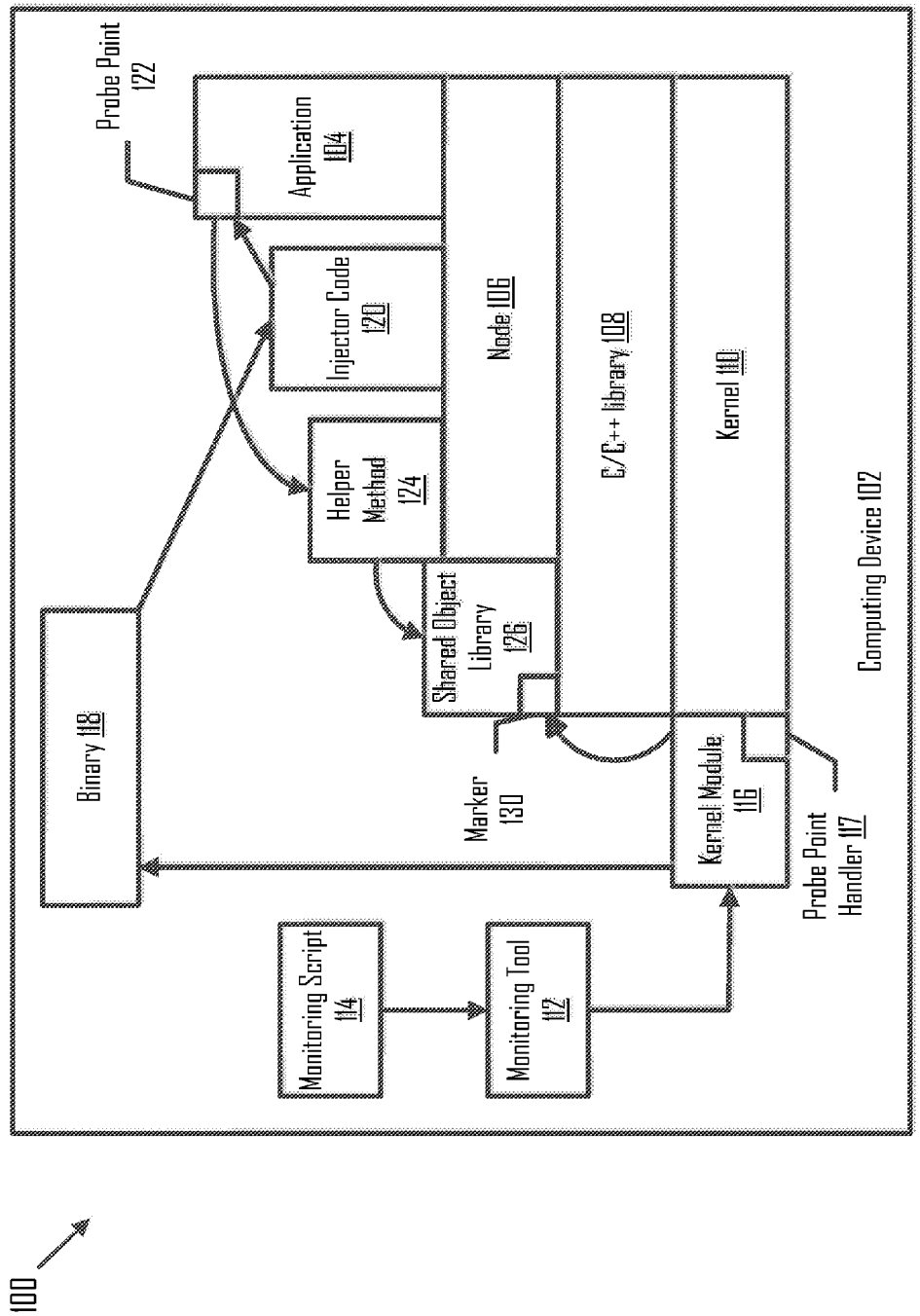
FIG. 1 is a simplified block diagram illustrating a system for dynamically probing a method, according to an embodiment.

I. Overview
II. Example System Architecture
   A. Monitor the Application Using a Probe Point
   B. Identify the Target Method to Probe
   C. Modify the Application
     1. Insert Code into the Application
     2. Multiple Probe Points
   D. Helper Method Passes Information to the Kernel Module
III. Example Method
IV. Example Computing System I. Overview It is to be understood that the following disclosure provides many different embodiments, or examples, for implementing different features of the present disclosure. Some embodiments may be practiced without some or all of these specific details. Specific examples of modules and arrangements are described below to simplify the present disclosure. These are, of course, merely examples and are not intended to be limiting.

Systemtap is a software development tool that allows collection of data from a kernel and user-space applications. Systemtap includes a library of predefined probes and functions for the kernel (e.g., tapsets) and a scripting language to do on-the-fly data reduction. Systemtap's probing capabilities can be extended to user-space applications. For example, Systemtap can be used to define probes in a binary for the purpose of monitoring the execution of the binary by threads. The probes allow investigation of the operation of the program without the need to recompile or restart the program.

An application may have embedded markers, which expose selected names and values to the Systemtap scripts. A Systemtap script includes name events and handlers. An event and its corresponding handler may be collectively called a probe. A Systemtap script may have multiple probes. Whenever a specified event occurs, the kernel runs the handler as if it were a quick subroutine, then resumes. Examples of events include entering or exiting a method, a timer expiring, or the entire Systemtap session starting or stopping. As events occur on any processor, the compiled handlers run. A handler is a series of script language statements that specify the work to be done whenever the event occurs. This work may include extracting data from the event context, storing them into internal variables, or printing results.

Systemtap translates a Systemtap script to C and runs the system C compiler to create a kernel module from the Systemtap script. When the kernel module is loaded in the kernel of a computing device executing the script, Systemtap monitors for events by hooking into the kernel, and launches the related handlers when the probe point is hit. Eventually, the session stops, the hooks are disconnected, and the module is removed. This entire process may be driven from a single command-line program, stap.

Typically, Systemtap and other system-wide observation tools have been limited to the C/C++ runtime. Accordingly, if inspection of a program or application (written in another, more abstracted language) is being attempted, Systemtap typically places probe points directly on the underlying library, virtual machine, or interpreter. This approach yields the unfortunate side effect of hitting a probe point every time any method is called, with the potential for large overhead. It may be desirable to overcome these disadvantages.

The present disclosure provides techniques in which only the target methods specified by the Systemtap script actually trigger the probe points. Further, users may be allowed to inspect the primitive method parameters passed to the probed method and subject the values to Systemtap's full range of data manipulation and inspection capabilities.

For brevity, the disclosure may describe Systemtap as being the technology that monitors the application, but this is not intended to be limiting and it should be understood that other technologies that provide application monitoring are within the scope of the disclosure. Further, the disclosure uses the terms method and function interchangeably in relation to a method or function being probed or invoked.

II. Example System Architecture

FIG. 1 is a simplified block diagram illustrating a system 100 for dynamically probing a method, according to an embodiment. System 100 includes a computing device 102. Computing device 102 may be a workstation, computer, server, game console, set-top box, kiosk, embedded system, mobile device (e.g., a mobile phone, personal digital assistant, tablet, and laptop), or other device having at least one processor and memory.

Computing device 102 may execute an application 104 that is written in a high-level programming language. In an example, application 104 is written in an object-oriented programming language that defines classes. A data object may be a self-contained entity that has state and behavior and represents an instance of a class. The data object's state may be described as its fields and properties, and the data object's behavior may be described by its methods. Application 104 may include code that creates objects of a class, and an object of a particular class may expose methods and properties defined by that class.

An application running on a node 106 may instantiate a data object via the node. Node 106 is an environment in which application 104 executes. In an example, application 104 is written in the Java® programming language, and node 106 is a JVM that is written in a programming language different from Java (e.g., C and/or C++). Trademarks are the property of their respective owners. In the example illustrated in FIG. 1, node 106 is written in the C and C++ programming language and runs on top of a C/C++ library 108 and on top of computing device 102's operating system, which includes a kernel 110. In another example, node 106 us written exclusively in C++ and some libraries and other utilities are written in C.

A. Monitor the Application Using a Probe Point

A user may be interested in application 104 and desire to monitor it. A monitoring tool 112 may be installed on computing device 102 and may enable a user to gather information about application 104. Monitoring tool 112 may receive a monitoring script 114 that specifies a target method to probe in application 104, a class name that includes the target method, and a set of method parameters that is passed into the target method (if any parameters are passed into the target method). Monitoring script 114 may also specify a unique identifier and one or more actions to execute when the target method is invoked. The unique identifier may be a process identifier (ID) assigned to the application, a fully qualified class that uniquely identifies the class in which the target method is included, or a combination of these. When the event occurs, the handler that handles the event may execute the one or more specified actions. The one or more actions may include, for example, printing a phrase to a screen of computing device 102 (e.g., to the command line) or to a file.

For brevity, the disclosure may describe monitoring script 114 as specifying one target method to probe. It should be understood, however, that monitoring script 114 may specify multiple target methods to probe along with the information associated with these target methods (e.g., class name, unique identifier, set of method parameters, and the one or more actions to perform when the particular target method is invoked).

Table A illustrates the basic syntax of an example Java probe point.

TABLE A

Probe java ("PNAME").class("CLASS").method("METHOD") {handler}

In the example illustrated in Table A, PNAME may be the string of the Java program or the specific process ID of the Java program. The CLASS parameter may be the fully qualified class name, and the METHOD parameter may be the target method name with parameter types.

Application 104 may be dynamically probed on a per method basis. A user may select the target method of interest to probe in application 104 and specify the target method along with the parameter types for the probe point in monitoring script 114. The parameter types may be the parameters types of the set of method parameters passed into the target method. Monitoring tool 112 may parse the desired probe point from monitoring script 114 and translate that information to store particular probe points in kernel module 116 as well as launch binary 118 with the appropriate set of method parameters. In an example, probe point handler 117 may launch monitoring script 114. The launch of binary 118 is further described below. Monitoring tool 112 may also determine a parameter count of the target method and create kernel module 116 in accordance with parsing monitoring script 114. Monitoring tool 112 may include the parameter count of the target method in kernel module 116.

In an example, application 104 is a Java application and monitoring tool 112 is Systemtap. In an example, javac may compile a file "foo.java" to "foo.class," which is included in application 104 and may be instantiated during the execution of application 104.

Table B illustrates an example "foo" class having a method "bar" along with three parameters.

TABLE B

```
class foo {
method bar (string a, int byteman, long c) { }
}
```

Monitoring script 114 may instruct monitoring tool 112 on what type of information to collect and what to do once that information is collected. In an example, the user may want to probe the method bar and print out the parameters that method bar was passed. Table C illustrates an example monitoring script 114 to probe method bar and print out the parameters that method bar was passed.

TABLE C

```
stap -e 'probe java("foo").class("foo").method("bar(string, int, long)")
{printf("%s %d %d\n", user_string($arg1), $arg2, $arg3)}
```

In the example illustrated in Table C, java("foo") may indicate that FOO is the process name, class("foo") may indicate that FOO is the class name, and method("bar(string, int, long)") may indicate that BAR is the method name with parameter types string, int, and long. As illustrated in Table C, a variable that is of a string type may be specified by using the user_string( ) Systemtap function so that Systemtap interprets the particular variable as a string. The user may access the parameters by parameter number.

The user may submit monitoring script 114 to monitoring tool 112 for processing. In an embodiment, monitoring tool 112 processes monitoring script 114 by translating it to a native programming language, creating a kernel module in accordance with monitoring script 114, and compiling the kernel module to determine compiled kernel module 116. Monitoring tool 112 may load kernel module 116 into kernel 110 of computing device 102. Kernel module 116 includes a probe point handler 117 that executes one or more actions based on an event occurring (e.g., a target method being invoked) and may also invoke events that have subsequent actions outside of the handler (e.g., running a shell script).

B. Identify the Target Method to Probe

In an embodiment, kernel module 116 identifies in accordance with monitoring script 114 a target method to probe in application 104. During execution of application 104 on computing device 102, kernel module 116 may detect when the target method is invoked. Kernel module 116 may monitor for the event. In an example, kernel module 116 may determine that the target method has been invoked when a helper method 124 is invoked, as will be explained further below. Monitoring tool 112 may verify that application 104 is already executing. Kernel module 116 may also monitor one or more applications executing on computing device 102 and detect when an application including the target method is executing. In an example, the unique identifier included in monitoring script 114 is a process ID that uniquely identifies the application, and kernel module 116 detects when the method is invoked by detecting when an application assigned the process ID is executing. Kernel module 116 may then detect when the target method included in the specified class name of the application is invoked.

In another example, the unique identifier included in the monitoring script 114 is a fully qualified class name that uniquely identifies the class including the target method, and kernel module 116 detects when the target method is invoked by detecting when a class that matches the fully qualified class name has been instantiated. Kernel module 116 may then detect when a method (e.g., target method to probe) directly from the fully qualified class name has been invoked. In another example, the process ID and the fully qualified class name are included in the monitoring script 114. These are merely examples, and other techniques to identify the application or the class name including the target method to probe are also within the scope of the disclosure.

C. Modify the Application

In an embodiment, monitoring tool 112 launches, via kernel module 116, a binary 118 capable of modifying application 104. Kernel module 116 may launch binary 118, for example, when kernel module 116 detects that the target method is invoked (e.g., when kernel module 116 detects that an application matching the process ID specified in monitoring script 114 is executing, or when kernel module 116 detects that a class matching the fully qualified class name has been instantiated). Kernel module 116 may also launch binary 118 based on other events. In another example and as will be explained further below, kernel module 116 detects that the target method has been invoked when helper method 124 with a matching rulename has been invoked.

1. Insert Code into the Application

Binary 118 may cause injector code 120 to modify application 104 by injecting code into application 104. The modification to application 104 can be made without recompiling, repackaging, or redeploying application 104. Injector code 120 may be installed on computing device 102 and use data from binary 118 as input. Based on identifying the target method, application 104 may be modified. In an example, javac may compile a file "foo.java" to "foo.class," which is included in application 104 and may be instantiated during the execution of application 104. In another example, if the target method has already been just-in-time compiled, injector code 120 may handle the compilation and/or decompilation of application 104. For example, if application 104 is a Java application and node 106 is a JVM, to increase performance, the JVM may attempt to compile the Java byte code to the native architecture's machine language. If the code section of interest corresponding to the probe point has already been compiled to machine language, Byteman may be able to handle that altered state and still insert the helper method and parameters as described in the disclosure. The helper method may be independent of application 104 (e.g., Java program) and may be small in size, using little memory. Byteman is a tool that simplifies tracing and testing of Java programs.

Table D illustrates an example binary 118 that is generated.

TABLE D

```
RULE <rulename>
CLASS <target fully qualified class>
METHOD <targeted method, including parameter type>
HELPER org.systemtap.byteman.helper.HelperSDT
AT <ENTRY or RETURN or LINE XXX>
IF TRUE
DO METHOD_STAP_PROBEX(<rulename>, Xparameters)
ENDRULE
```

Injector code 120 may modify application 104 by inserting a probe point 122 in application 104 at a location relative to the target method to probe. In such an example, injector code 120 may modify the target method by inserting probe point 122 at the target method (e.g., at actual entry, exit, or a particular line number of the target method) to include a call to a helper method 124.

2. Multiple Probe Points

Multiple probe points may be created and included in kernel module 116 based on a single method probe point inserted into application 104. In an example, three probe points are created and included in kernel module 116 for the method probe point inserted in application 104. In such an example, the inserted probe point may be java("foo").class ("foo").method("bar"){}. A first probe point inserted in kernel module 116 may be for the instantiation of the target java program. Kernel module 116 may detect when a Java process has begun, and probe point handler 117 may include a first probe point handler for the first probe. The first probe point handler may launch binary 118 (e.g., Byteman script) with the appropriate information passed as parameters that were gathered from monitoring tool 112's invocation. In an example, the first probe point handler launches binary 118 to write a rule (e.g., Byteman rule) and installs and submits the rule.

A second probe point inserted in kernel module 116 may target the related marker in shared object library 126 (e.g., libHelperSDT.so). Probe point handler 117 may include a second probe point handler for the second probe. The second probe point handler may vary based on the handler initially specified by the user when invoking monitoring tool 112. The second probe point handler may include a determination of whether the known rulename for the target method matches the rulename passed by the marker. In the case of a single Java probe point, it may be unnecessary to make this determination. In the case of multiple Java probe points running concurrently (and possibly with the same number of parameters), this determination may be important to identify the appropriate marker associated with the rulename. The rulename may allow for a very small number of markers in shared object library 126 and may allow for the markers to be reused by various (and simultaneous) applications 104 (e.g., Java applications). Additionally, the rulename may be generated on-the-fly by the monitoring tool 112. Monitoring tool 112 may dynamically generate a rulename that is guaranteed to be unique. In this way, monitoring tool 112 may provide a mechanism that provides conflict-resolution guarantees so that multiple concurrent script probes (even copies of the same script) can run against the same node 106, application, and method.

A third probe point inserted in kernel module 116 may target the end of the java process. Probe point handler 117 may include a third probe point handler for the third probe. The third probe point handler may be for the ending of the target java program (or monitoring tool 112). The third probe point handler may uninstall the rule (e.g., Bytename rule) via binary 118. Another identical probe point may exist to target the Java application if it ends with an error.

In an example, monitoring tool 112 is Systemtap, monitoring script 114 is a Systemtap script, and the native programming language is C. In such an example, Systemtap may obtain the Systemtap script and run the system C compiler to compile a kernel module to determine kernel module 116. Further, binary 118 may be a Byteman script, and injector code 120 may be Byteman code. Byteman is a tool that simplifies tracing and testing of Java programs. Byteman enables insertion of extra Java code into an application, either as it is loaded during Java Virtual Machine (JVM) startup or after the application has already started running The injected code may access the application data or call any application methods, including private data and methods. The Byteman script may call the Byteman code to inject code into application 104 as discussed in the present disclosure. In an example, the Byteman code that is injected into application 104 is Java code that has a helper method call inserted into it. In this way, a call to the helper method is inserted into application 104 and when the target method is invoked, a call to the helper method is made. The functionality of the helper method is further described below.

The Byteman script may write the requested Byteman rule to determine whether the target program already has a Byteman agent installed (by port number tracking) and submit (and remove) rules. To use a Byteman rule, a Byteman agent is installed (or attached to the Java process) and the Byteman rule is submitted, which includes the actual modification to the application to call the helper method. If several rules are being attached to the same process, it may be unnecessary to install the Byteman agent more than once. To manage this, the port used to initially connect to the java process is tracked and if the port is still open, any other rules may be submitted or resubmitted or uninstalled. The same tracking may be used to determine the port to use when erasing or uninstalling the Byteman rule when the java process ends.

As discussed, kernel module 116 may monitor Java process invocation by detecting each Java process invocation. This may be advantageous to determine whether the Java application matches the target application, and if so, launching binary 118 to install and submit the rule (e.g., Byteman rule). Determining whether the Java application matches the target application, however, may use another Java application to do so. Invoking the other Java application (e.g., JPS) in turn may re-trigger the first probe point, which then checks again to determine whether the detected Java process that is running matches the target process. To further compound the issue, binary 118 itself may be a Java program, and both installing the rule and installing the agent may trigger this check. In an embodiment, to overcome this problem, upon kernel module insertion (e.g., immediately upon kernel module insertion), binary 118 is run to install the rule. This has the side effect of requiring any Java process that is targeted to already be running at the time of script invocation of monitoring script 114.

Table E illustrates an example generated Byteman rule for stap -e "probe java("foo").class("foo").method("printMessage(String)"){}.

TABLE E

RULE stap_bb4c63f7_4052probe_2068
CLASS foo
METHOD printMessage(String)
HELPER org.systemtap.byteman.helper.HelperSDT
AT ENTRY
IF TRUE
DO METHOD_STAP_PROBE1("stap_bb4c63f7_4052probe_2068", $1)
ENDRULE D. Helper Method Passes Information to the Kernel Module Probe point 122 may be a method that causes helper method 124 to be called. Helper method 124 may pass information to a native method in a shared object library 126. Shared object library 126 may be foreign function interface. In an example, helper method 124 is part of a Java class and dynamically calls the native method in shared object library 126, which is a Java Native Interface (JNI). Shared object library 126 may be independent of application 104 (e.g., Java program) and may be small in size, using little memory. The foreign function interface may be used to pass high level information (e.g., rulename and a set of method parameters passed into the target method) and may be used to expand monitoring tool 112's native capabilities to, for example, Java. Passing the rulename and the set of method parameters passed into the target method enables inspection of probe point 122 and marker 130 using the foreign function interface. In an example, helper method 124 is written in Java and uses a Java Native Interface (JNI) to pass the information to kernel module 116 via shared object library 126. In such an example, shared object library 126 may be written in the C (or C++) programming language, and helper method 124 may call a C (or C++) class. This example is not intended to be limiting, and this approach may be used for any programming language that includes a foreign function interface and a tool that can alter methods/functions (e.g., Byteman for Java). For example, this approach may be used for Python, Perl, Tool Command Language (TCL), LuaJit, or Ruby.

In an embodiment, injector code 120 modifies the target method to include a call to helper method 124 that passes the rulename to a native method in shared object library 126. The rulename specifies the marker associated with the probe point. The rulename may have several key properties. For example, due to the possibility of having several users running the same script at the same time, a property of the rulename may be that it is unique on a system-wide level. Further, due to the possibility of multiple probe points having the same number of parameters or even targeting the same probe point, a property of the rulename may be that it is unique within the script. Moreover, compile-time determination of the rulename may not be unique enough. As such, the determination of the rulename may be computable by monitoring application 112 at runtime. Additionally, the rulename may be passable to binary 118 (the script/stap portion that automatically creates the Byteman rule), back through the .btm file, and back through the sdt.h parameters. In an embodiment, the rulename is a property of the kernel module name concatenated with the probe point number of the probe point. In an example, the rulename may be module_name( ).probe_NNNN, where the function returns the name of the stap module either generated randomly (e.g., stap_[0-9a-f]+_[0-9a-f]+) or set by stap -m <module_name>), and the same logic of generating the probe point number may apply. In an example, kernel module 116 is the Systemtap module.

The native method in shared object library 126 may include a marker 130 that is associated with probe point 122. Marker 130 may be placed in code that provides a hook to call a function that is provided at runtime, and kernel module 116 may hook into marker 130 in the shared object library 126. The provided function may be called each time marker 130 is executed, in the execution context of the caller. When the function provided ends its execution, execution flow may return to the caller (continuing from the marker site). In an example, execution of the application resumes from the target method. As such, injector code 120 may modify the target method to include a call to helper method 124 that enables monitoring tool 112 to inspect probe point 122 and marker 130 using shared object library 126. In an embodiment, marker 130 is an SDT marker that is a defined marker that the developer compiles into binary code. In such an embodiment, marker 130 may be compiled as a binary into shared object library 126. When the marker is not in use, the binary code may simply be a no operation instruction (e.g., a "NOP"). When the marker is in use, it may pass one or more parameters to kernel module 116 for inspection.

Table F illustrates an example form for a marker.

TABLE F

STAP_PROBE10(HelperSDT, method_9, arg1, arg2, arg3, arg4, arg5, arg6, arg7, arg8, arg9, rulename)

In the example illustrated in Table F, "STAP_PROBE10" may be marker 130 in shared object library 126, and 10 may be the number of arguments in marker 130 or the number of arguments being passed from the target method. The helper method passes the rulename and any parameters along to shared object library 126. "STAP_PROBE10" indicates ten arguments that monitoring script 114 interprets. In an example, a limitation of ten arguments can be passed from shared object library 126 to kernel module 116. In such an example, because of the rulename being a parameter, only Java nine parameters may be passed through marker 130 and method_9 may be supplied as the marker name. The number of arguments in marker 130 may match the number of arguments being passed from the target method. If the target method has one or more method parameters, injector code 120 may modify the target method to include the call to the helper method to also pass the set of method parameters. In an example, a family of generic native methods may take up to 10 user-provided arguments of an arbitrary type. The user-provided arguments may be mapped to the Systemtap types (e.g., strings and numbers).

In another example, if the target method to be probed is "foo(int a, int b, int c)", marker 130 in shared object library 126 may be "STAP_PROBE4(HelperSDT, method_3, arg1, arg2, arg3, rulename). HelperSDT may be an arbitrary (yet associatively descriptive) name of the function that calls the native method. In an example, marker 130 is a Systemtap marker and marker 130 is included in the native method using sdt.h markers, which is defined in #include <sys/sdt.h>.

In an example, shared object library 126 has three components. A first component includes HelperSDT.java, which includes the method STAP_PROBEX helper functions, which call the equivalent C or C++ functions. A second component includes HelperSDT.h, which includes the jni.h header and boilerplate JNIEXPORT function declarations. A third component includes HelperSDT.c, which includes the actual function declarations. The actual function declarations may include primitive type declarations as well as markers, which pass the information (e.g., rulename and set of method parameters).

The rulename passed in as a parameter of STAP_PROBEX may be matched with the rulenames in kernel module 116 to determine which probe point handler to execute. When a trigger event occurs (e.g., the target method is invoked), probe point handler may invoke events that have subsequent actions outside of the handler (e.g., running binary 118). The rulename may vary depending on the specific probe point. This may be important when there are multiple methods being probed simultaneously, possibly with the same number of parameters. The set of method parameters includes one or more parameters passed into the target method. Monitoring tool 112 may parse monitoring script 114 and determine a parameter count of the target method in accordance with parsing monitoring script 114. Monitoring tool 112 may create kernel module 116 in accordance with parsing monitoring script 114 and include the parameter count of the target method. An additional parameter that may be passed to the marker is the rulename. The parameter count of the target method may then be passed as a parameter to binary 118, which may perform the automated rule writing and Byteman operations, as discussed above. In an example, if the parameter count of the target method is zero, one parameter (e.g., the rulename) is passed to the marker. When the parameter count of the target method is greater than zero, code injector 120 may modify the target method to include the call to helper method 124 that passes one or more method parameters of the target method, and the helper method 124 may pass the one or more method parameters of the target method to the native method in shared object library 126.

As discussed, the rulename parameter may be a mechanism used to uniquely identify the marker the specific probe point is targeting and to ensure that only the proper marker is tracked for each specific probe point. Kernel module 116 may be configured to register all markers in shared object library 126. Helper method 124 and the native method may be designed to accept any object passed as a parameter.

In an example, helper method 124 identifies the rulename and the set of method parameters. One or more parameters of the set of method parameters may include an object including one or more primitive types of a first programming language in which application 104 is written (e.g., Java). The foreign function interface (e.g., JNI) may include an application programming interface (API) that allows shared object library 126 (e.g., the C/C++ (native) side of things) to test the object for different primitive types, and if found, the foreign function interface may pass the correct primitive type through marker 130. The JNI API may be used to provide some functionality on extracting primitive values.

Helper method 124 may identify the object in the set of method parameters and determine whether the object includes different primitive types of the first programming language. When the object is determined to include different primitive types of the first programming language, helper method 124 may determine primitive types of a second programming language (e.g., native programming language), where each determined primitive type of the second programming language corresponds to a primitive type of the first programming language. Helper method 124 may pass the determined primitive types of the second programming language to shared object library 126, which may then pass the determined primitive types of the second programming language to kernel module 116.

In another example, helper method 124 passes the rulename and the set of method parameters to shared object library 126, which then performs the actions of identifying primitive types of the second programming language to pass along to kernel module 116. In such an example, shared object library 126 may obtain the rulename and the set of method parameters from helper method 124. Shared object library 126 may identify the object in the set of method parameters and determine whether the object includes different primitive types of the first programming language. When the object is determined to include different primitive types of the first programming language, shared object library 126 may determine primitive types of a second programming language (e.g., native programming language), where each determined primitive type of the second programming language corresponds to a primitive type of the first programming language. Shared object library 126 may pass the determined primitive types of the second programming language to kernel module 116.

Monitoring tool 112 may access the primitive types of the second programming language via kernel module 116 and perform tests on these primitives in accordance with monitoring script 114. Binary 118 specifies the helper method to be called when probe point 122 is hit and is part of the system that passes the information to (and through) shared object library 126 and ultimately to kernel module 116 (through marker 130). As discussed, injector code 120 may call helper method 124, which may then communicate information about probe point 122 to shared object library 126. Kernel module 116 may hook into shared object library 126 via marker 130 in the native method. In an example, monitoring tool 112 uses kernel module 116 to communicate with probe point 122 and obtains the rulename and the determined primitives of the second programming language via marker 130. Monitoring tool 112 may be aware when a target method is invoked via kernel module 116 (eg. helper method 124 has been hit). When the target method is invoked, probe point handler 117 in kernel module 116 may execute the one or more actions in accordance with monitoring script 114.

Shared object library 126 may pass the rulename and the set of method parameters to kernel module 116 via marker 130. Monitoring tool 112 may be able to easily access marker 130 in shared object library 126 with little overhead because monitoring tool 112 understands the native programming language (e.g., C or C++). Monitoring tool 112 is able to understand the output associated with the target method by hooking into shared object library 126 via marker 130 in the native method. Monitoring tool 112 may monitor the operating system for specified events and execute handlers as they occur. In an example, monitoring tool 112 may obtain the rulename and the set of method parameters via marker 130. Monitoring script 114 may determine what actions to perform based on the information (e.g., rulename and set of method parameters), which is in kernel module 116. In an example, when the method is invoked kernel module 116 may run the handler to execute the one or more actions specified in monitoring script 114. Monitoring tool 112 may provide output based on execution of the one or more actions included in monitoring script 114. After the one or more actions are executed, execution of application 104 may resume from the target method.

As discussed above and further emphasized here, FIG. 1 is merely an example, which should not unduly limit the scope of the claims. For example, it should be understood that computing device 102 may execute more than one application. Further, although the components and/or modules illustrated in FIG. 1 are illustrated as being housed in a single computing device, other embodiments in which the components and/or modules illustrated in FIG. 1 are housed in different computing devices are within the scope of the disclosure.

For example, computing device 104 may be coupled to a network (not shown). The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing. In an example, monitoring tool 112 is coupled to computing device 102 over the network.

To probe a standalone server, it may be desirable for the packages of both monitoring tool 112 and injector code 120 to be visible to the target's class loaders. In an example, monitoring tool 112 and injector code 120 packages are made visible to the target's class loaders by editing the configuration file directly. In another example, monitoring tool 112 and injector code 120 packages are made visible to the target's class loaders by modifying the environment variable on server startup to list the particular packages. For example, if monitoring tool 112 is Systemtap and injector code 120 is Byteman, the environment variable may be modified on server startup to list org.jboss.byteman and org.systemtap.byteman.helper package in the JBOSS_MODULES_SYSTEM_PKGS option.

III. Example Method

Figure 2:
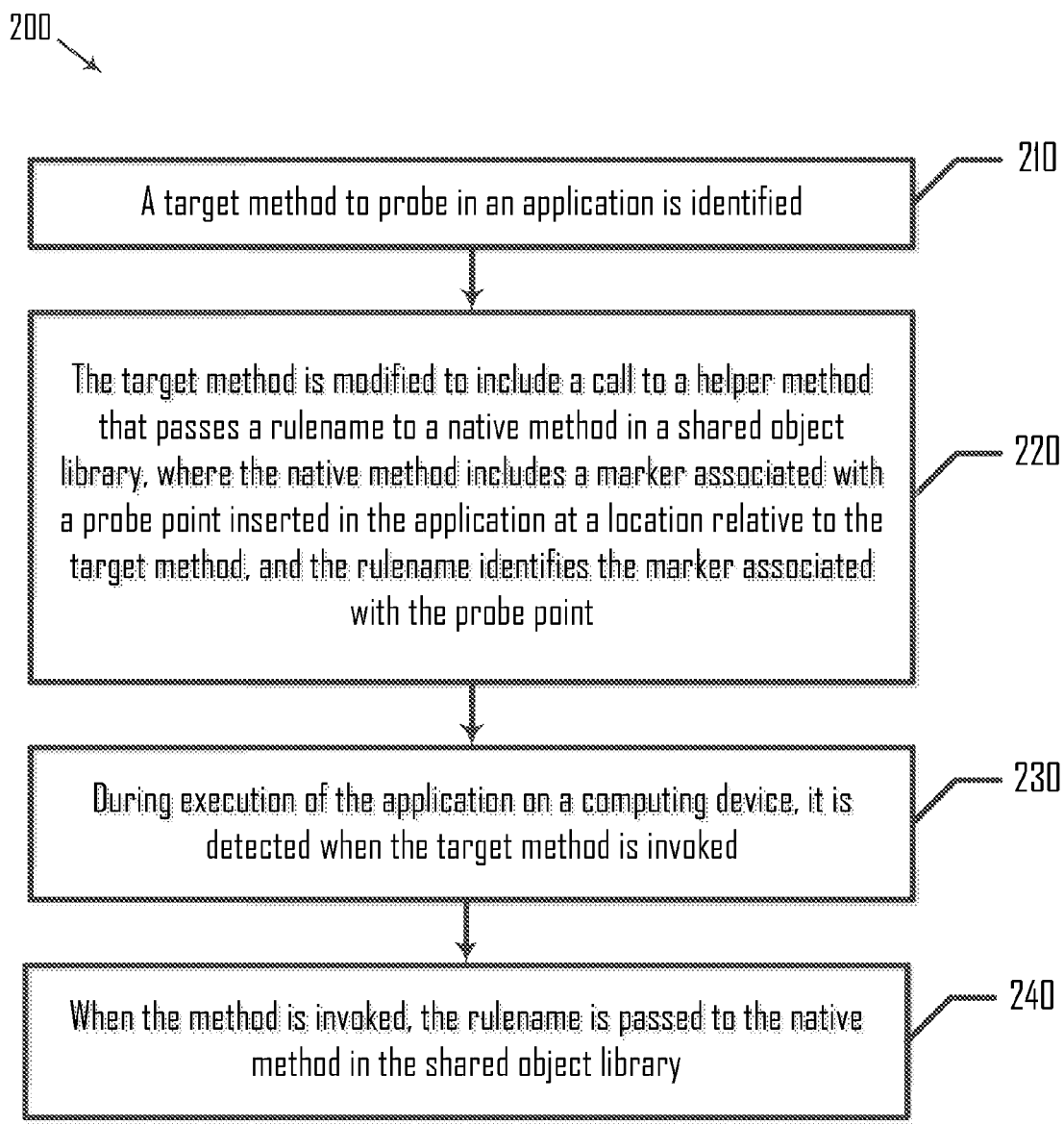
FIG. 2 is a flowchart illustrating a method of dynamically probing a method, according to an embodiment.

FIG. 2 is a flowchart illustrating a method 200 of dynamically probing a method, according to an embodiment. Method 200 is not meant to be limiting and may be used in other applications.

In FIG. 2, method 200 includes blocks 210-240. In a block 210, a target method to probe in an application is identified. In an example, kernel module 116 identifies a target method to probe in application 104.

In a block 220, the target method is modified to include a call to a helper method that passes a rulename to a native method in a shared object library, where the native method includes a marker associated with a probe point inserted in the application at a location relative to the target method, and the rulename identifies the marker associated with the probe point. In an example, injector code 120 modifies the target method to include a call to a helper method that passes a rulename to a native method in a shared object library, where the native method includes a marker associated with a probe point inserted in the application at a location relative to the target method, and the rulename identifies the marker associated with the probe point.

In a block 230, during execution of the application on a computing device, it is detected when the target method is invoked. In an example, during execution of the application on a computing device, kernel module 116 detects when the target method is invoked. For example, kernel module 116 may detect that the target method has been invoked when helper method 124 has been invoked.

In a block 240, when the method is invoked, the rulename is passed to the native method in the shared object library. In an example, when the method is invoked, helper method 124 passes the rulename to the native method in the shared object library.

It is also understood that additional processes may be performed before, during, or after blocks 210-240 discussed above. It is also understood that one or more blocks of method 200 described herein may be omitted, combined, or performed in a different sequence as desired.

IV. Example Computing System

Figure 3:
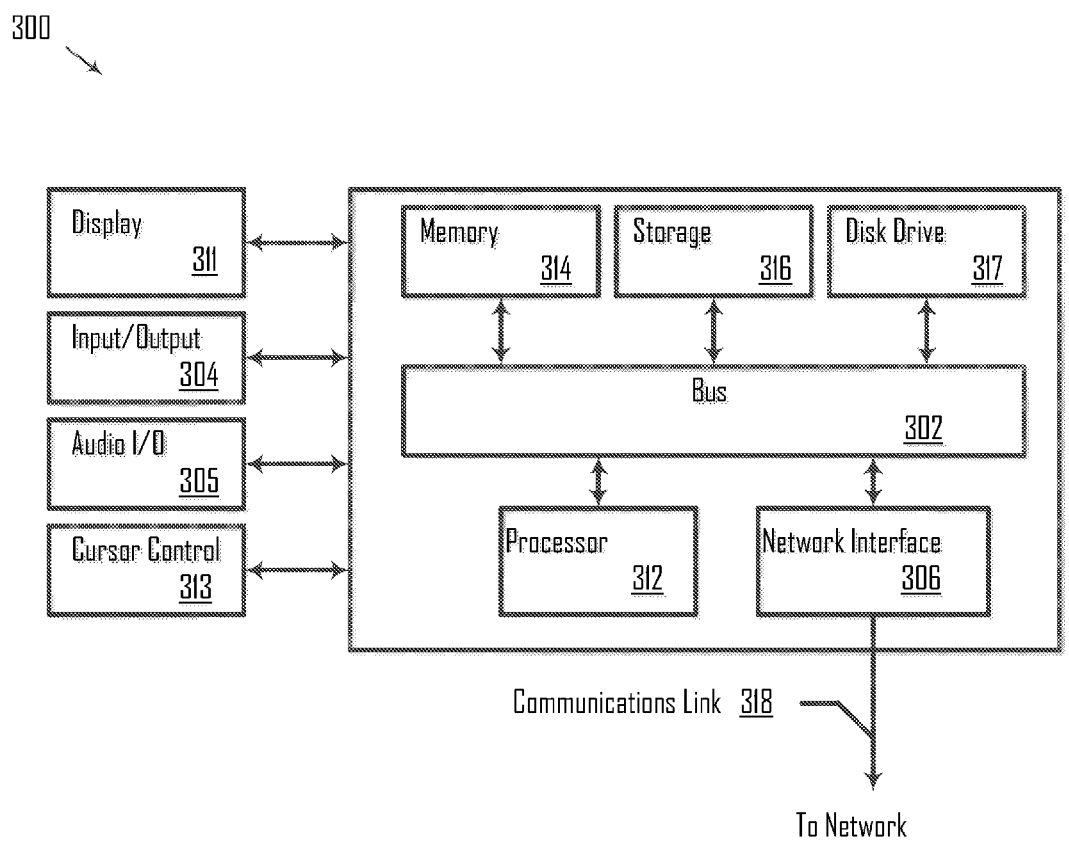
FIG. 3 is a block diagram of an electronic system suitable for implementing one or more embodiments of the present disclosure.

FIG. 3 is a block diagram of a computer system 300 suitable for implementing one or more embodiments of the present disclosure. Computer system 300 may include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to computing device 102 using a computer network (not shown). The computer network may be any type of network including a LAN, a WAN, an intranet, the Internet, a cloud, and/or any combination of networks thereof that is capable of interconnecting computing devices and/or computer programs in the system.

Computing device 102 may be, for example, a client computer or a server computer. Computer system 300 includes a bus 302 or other communication mechanism for communicating information data, signals, and information between various components of computer system 300. Components include an input/output (I/O) component 304 that processes a user action, such as selecting keys from a keypad/keyboard, selecting one or more buttons or links, etc., and sends a corresponding signal to bus 302. I/O component 304 may also include an output component such as a display 311, and an input control such as a cursor control 313 (such as a keyboard, keypad, mouse, etc.). A transceiver or network interface 306 transmits and receives signals between computer system 300 and other devices via a communications link 318 to a network. In an embodiment, the transmission is wireless, although other transmission mediums and methods may also be suitable. A processor 312, which may be a micro-controller, digital signal processor (DSP), or other processing component, processes these various signals, such as for display on computer system 300 or transmission to other devices via communications link 318. Processor 312 may also control transmission of information, such as cookies or IP addresses, to other devices.

Components of computer system 300 also include a system memory component 314 (e.g., RAM), a static storage component 316 (e.g., ROM), and/or a disk drive 317. Computer system 300 performs specific operations by processor 312 and other components by executing one or more sequences of instructions contained in system memory component 314. Logic may be encoded in a computer readable medium, which may refer to any medium that participates in providing instructions to processor 312 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 314, and transmission media includes coaxial cables, copper wire, and fiber optics, including wires that include bus 302. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, memory cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 318 to the network (e.g., such as a LAN, WLAN, PSTN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable media. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of dynamically probing a method, the method comprising:
   identifying a target method to probe in an application, the application written in an object-oriented programming language that defines a class that includes the target method;
   modifying the target method to include a call to a helper method that passes a rulename to a native method in a foreign function interface, wherein the native method includes a marker associated with a probe point inserted in the application at a location relative to the target method, and the rulename identifies the marker associated with the probe point;
   during execution of the application on a computing device, detecting when the target method is invoked;
   when the target method is invoked, passing the rulename to the native method in the foreign function interface;
   hooking into the foreign function interface via the marker included in the native method;
   obtaining the rulename via the marker; and
   obtaining the one or more method parameters via the marker if the target method is determined to have one or more method parameters.

2. The method of claim 1, wherein the modifying the target method includes inserting the probe point at the location, wherein the probe point causes the helper method to be called, and wherein the helper method dynamically calls the native method.

3. The method of claim 1, further including:
   determining whether the target method has one or more method parameters, wherein when the target method is determined to have one or more method parameters, the modifying the target method includes modifying the target method to include the call to the helper method that passes the one or more method parameters, and wherein the passing includes passing the one or more method parameters to the native method in the foreign function interface.

4. The method of claim 3, further including:
   obtaining a monitoring script that specifies the target method to probe, a class name that includes the target method, a unique identifier, and one or more actions to execute when the target method is invoked.

5. The method of claim 4, further including:
   creating a kernel module in accordance with the monitoring script;
   compiling the kernel module;
   loading the compiled kernel module into a kernel of the computing device; and
   launching, via the compiled kernel module, a binary script that modifies the target method to include the call to the helper method.

6. The method of claim 4, further including:
   providing output based on execution of the one or more actions included in the monitoring script.

7. The method of claim 6, further including:
   resuming execution of the application from the target method.

8. The method of claim 5, further including:
   obtaining the one or more method parameters; and
   identifying an object in the one or more method parameters, the object including one or more primitive types of a first programming language in which the application is written.

9. The method of claim 4, wherein the unique identifier is a process identifier associated with the application, and wherein the detecting when the method is invoked includes detecting that the helper method has been invoked.

10. The method of claim 1, further including:
    dynamically generating the rulename, wherein the rulename is unique.

11. A system for dynamically probing a method, the system comprising:
    a memory that stores at least a portion of an application;
    a kernel module that identifies a target method to probe in the application, wherein during execution of the application on a computing device the kernel module detects when the target method is invoked, wherein the application is written in an object-oriented programming language that defines a class that includes the target method;
    a helper method that passes a rulename to a native method in a foreign function interface; and
    a code injector that modifies the target method to include a call to the helper method that passes the rulename to the native method in the foreign function interface, wherein the native method includes a marker associated with a probe point inserted in the application at a location relative to the target method, and the rulename identifies the marker associated with the probe point, wherein the kernel module hooks into the foreign function interface via the marker included in the native method and obtains the rulename via the marker, and wherein if the target method is determined to have one or more method parameters, the kernel module obtains the one or more method parameters via the marker.

12. The system of claim 11, wherein the code injector inserts the probe point at the location, the probe point causes the helper method to be called, and the helper method dynamically calls the native method.

13. The system of claim 12, further including:
a monitoring tool that obtains a monitoring script that specifies the target method to probe, a class name that includes the target method, a unique identifier that identifies the application, and one or more actions to execute when the target method is invoked.

14. The system of claim 13, wherein the monitoring tool parses the monitoring script, and determines a parameter count of the target method and creates the kernel module in accordance with parsing the monitoring script, wherein the kernel module includes the parameter count of the target method.

15. The system of claim 13, wherein the monitoring tool dynamically generates a unique rulename.

16. The system of claim 14, wherein when the parameter count of the target method is greater than zero, the code injector modifies the target method to include the call to the helper method that passes one or more method parameters of the target method and the rulename, and wherein the helper method passes the one or more method parameters of the target method to the native method in the foreign function interface.

17. The system of claim 16, wherein the monitoring tool creates a kernel module in accordance with the monitoring script, compiles the kernel module, loads the compiled kernel module into a kernel of the computing device, and launches, via the compiled kernel module, a binary script that modifies the target method to include the call to the helper method.

18. A non-transitory machine-readable medium comprising a plurality of machine-readable instructions that when executed by one or more processors is adapted to cause the one or more processors to perform a method comprising:
identifying a target method to probe in an application, the application written in an object-oriented programming language that defines a class that includes the target method;
modifying the target method to include a call to a helper method that passes a rulename to a native method in a foreign function interface, wherein the native method includes a marker associated with a probe point inserted in the application at a location relative to the target method, and the rulename identifies the marker associated with the probe point;
during execution of the application on a computing device, detecting when the target method is invoked;
when the target method is invoked, passing the rulename to the native method in the foreign function interfaces;
hooking into the foreign function interface via the marker included in the native method;
obtaining the rulename via the marker; and
obtaining the one or more method parameters via the marker if the target method is determined to have one or more method parameters.

19. The method of claim 8, further including:
determining whether the object includes different primitive types of the first programming language; and
when the object is determined to include different primitive types of the first programming language, determining primitive types of a second programming language, wherein each determined primitive type of the second programming language corresponds to a primitive type of the first programming language.

20. The method of claim 19, further including:
passing the determined primitive types of the second programming language to the kernel module.

* * * * *

UNITED STATES PATENT AND TRADEMARK OFFICE
CERTIFICATE OF CORRECTION

PATENT NO. : 9,934,128 B2
APPLICATION NO. : 14/080596
DATED : April 3, 2018
INVENTOR(S) : Berk et al.

Page 1 of 1

It is certified that error appears in the above-identified patent and that said Letters Patent is hereby corrected as shown below:

In the Claims

In Claim 18, Column 18, Line 14:
Please replace "interfaces" with --interface--.

Signed and Sealed this
Thirty-first Day of July, 2018

Andrei Iancu
*Director of the United States Patent and Trademark Office*